Figure 1:
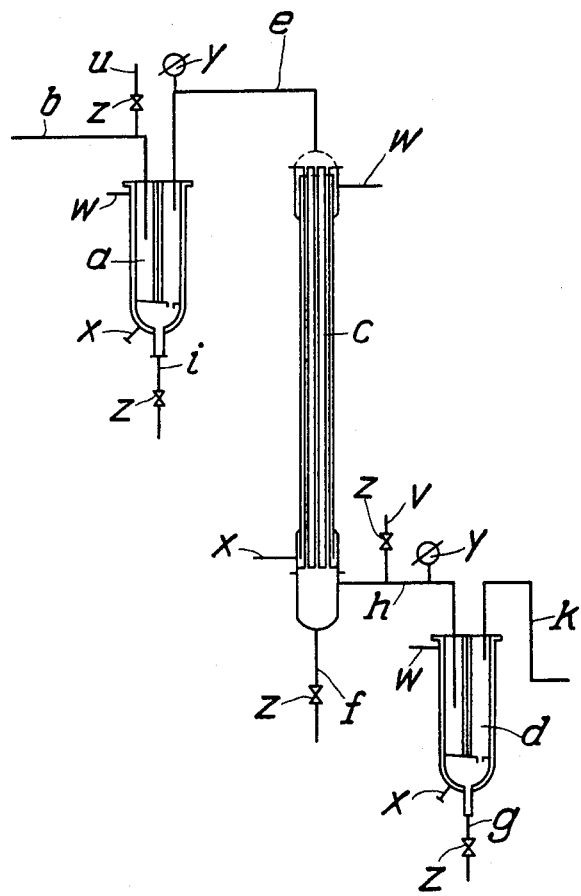

June 23, 1964 H. WEITTENHILLER ETAL 3,138,440
PROCESS FOR CLEANING GASES

Filed May 1, 1961 3 Sheets-Sheet 1

Inventor:
HELLMUTH WEITTENHILLER FRANZ BIEGER
By Burgess, Dinklage & Sprung
ATTORNEYS

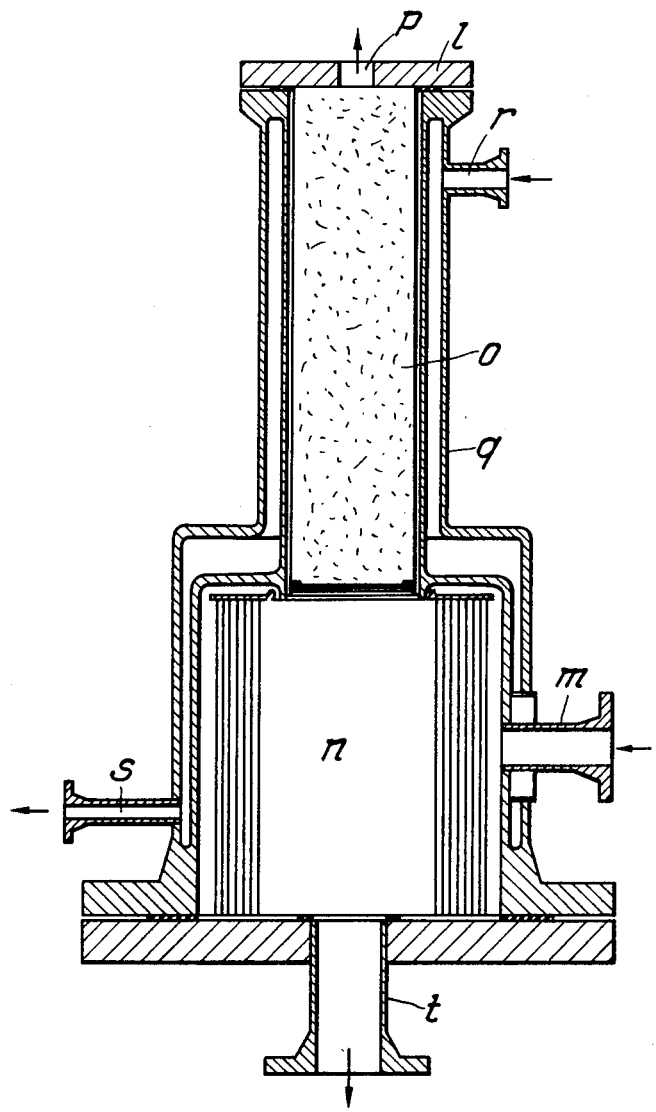

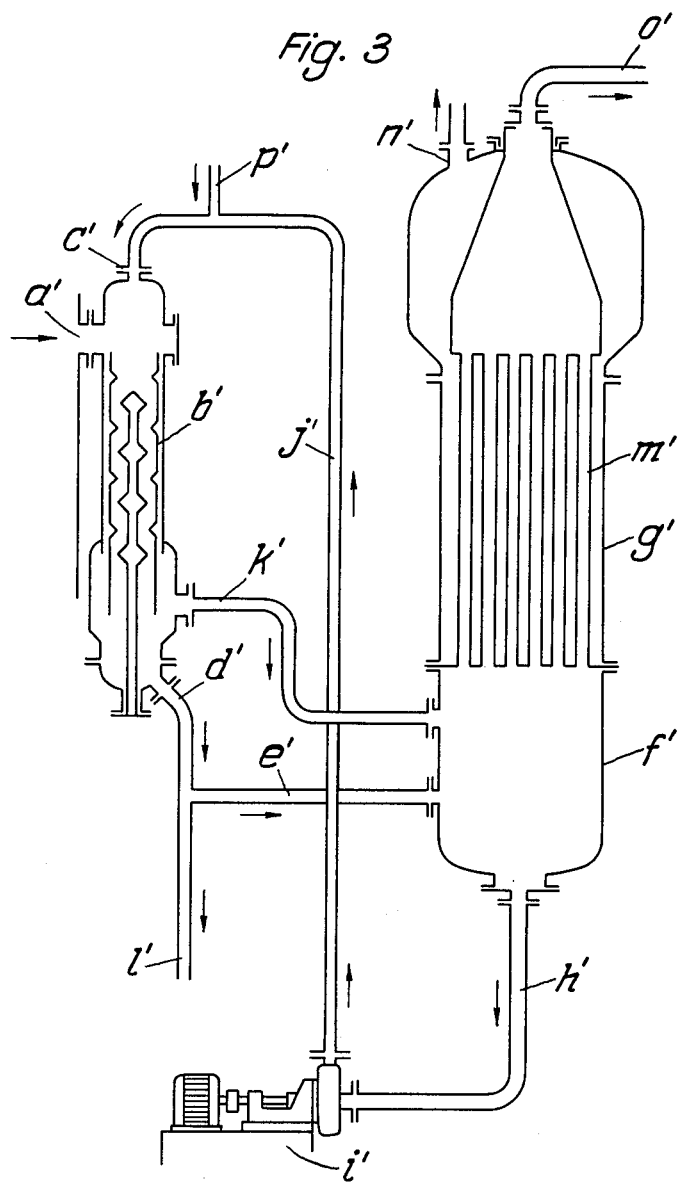

United States Patent Office 3,138,440
Patented June 23, 1964

3,138,440
PROCESS FOR CLEANING GASES
Hellmuth Weittenhiller, Essen-Bredeney, and Franz Bieger, Dorsten, Germany, assignors to Metallgesellschaft Aktiengesellschaft, Frankfurt am Main, Germany, and Steinkohlengas Aktiengesellschaft, Dorsten, Germany, both corporations of Germany
Filed May 1, 1961, Ser. No. 106,951
Claims priority, application Germany May 3, 1960
6 Claims. (Cl. 55—80)

The present invention relates to a process for cleaning gases, and more particularly to a process for separating from gaseous substances such as gases, vapors, and gas-vapor mixtures entrained droplet, mist, and dust particle constituents present in the gaseous substance as non-gaseous or non-vaporous components.

It is known that gaseous substances, such as gases, vapors, and gas-vapor mixtures, may be cooled from a higher elevated temperature to a lower elevated temperature and thereafter reheated to a desired higher temperature for subsequent treatment. The purpose of cooling from a higher elevated temperature to a lower elevated temperature may be necessary, for instance, in connection with the removal of high boiling condensates, such as tar, oils, water, and the like from such gaseous substance, i.e. gases, vapors, and gas-vapor mixtures or with the evaporation of liquids which may have been added to the gaseous substance for conversion into the gaseous phase.

Many procedures are known for removing from gaseous substances various components including droplets, mists, and even particles of dust and the like, which are not in the gaseous or vapor state but which may have formed upon the injection of liquids into the gases, vapors, or gas-vapor mixtures or upon the cooling of such gaseous substances to the saturation temperature of one or more of the components thereof or even to lower temperature levels. Such a removal treatment is especially desirable where gases, vapors, or gas-vapor mixtures containing such droplets, mists, or the like are intended to be heated subsequently to an elevated temperature for further treatment in an apparatus which would otherwise be corroded or fouled by deposits or encrustations caused by these droplets, mists, or the like if they were to remain in the gaseous substance.

In order to accomplish the desired removal use is often made of separating equipment, such as cyclones, multiclones, impingement separators, filters, and like apparatus. However, the efficiency of devices of the foregoing type is more or less satisfactory only if the particular device is operated at a well-defined load. Specifically, such devices fail to operate satisfactorily in cases where the presence of even very small quantities of finely dispersed droplets, mists, and/or solid particles of dust still remain after treatment, such small quantities being sufficient to give rise to major difficulties in various subsequent treatments of the gases, vapors, or gas-vapor mixtures. This is true especially with respect to catalytic refining, cyclizing, and similar chemical processes. Additionally, such separator devices, especially when the same are operated at temperatures higher than room temperature, possess the drawback that the velocity changes which take place in the separator device may cause temperature decreases, and in turn permit the further formation of fresh mists or droplets by condensation of components from the gaseous substance being treated.

Particularly troublesome difficulties often occur where the droplets and mists or the like must be removed from vapors or gas-vapor mixtures at temperatures below the dew point of the particular vapor or gas-vapor mixture involved. For instance, in the case a gas-steam-hydrocarbon mixture which is maintained at a pressure of about 22 atmospheres' gauge and contains about 40–60 grams of hydrocarbons per standard cubic meter boiling above about 300 degrees C., where such mixture has been cooled from an elevated temperature to the saturation temperature of the steam, i.e. about 180 degrees C., or even to lower temperatures for the purpose of precipitating a portion of the impurities contained in the mixture, such as tars, and/or oils, water and hydrocarbons in liquid form (droplets and/or mists) will still appear in subsequent treating apparatus despite the employment of the conventional means for the retention of liquids and the removal of the same from the vapor or gas-vapor mixture. This is especially true since the rate of cooling may be more rapid than the rate of condensation of some of the constituents in the mixture. Consequently, if such subsequent treatment apparatus includes a heat exchanger in which the mixture is to be reheated, for instance, to a temperature between about 300–400 degrees C., or other heating apparatus, the entrained liquid substances still present will be deposited on to the hot surfaces of any such equipment and thereby give rise to encrustations. It will be appreciated that this problem is especially troublesome if the products in question include decomposable, polymerizable, or high boiling hydrocarbon constituents. The operational periods of heat exchangers are thus frequently very short, and costly cleaning processes are often required to restore the apparatus to a condition approaching its original condition.

Moreover, entrained hydrocarbon and water droplets are generally non-corrosive in the presence of inhibitors such as alkaline substances. Nevertheless, such non-corrosive tendencies are lost when such droplets are heated. Upon evaporating the mists and droplets, the corrosive substances which they contain, such as chlorine, compounds, phenols, organic acids, and the like, do not evaporate but instead become more concentrated whereby their tendency to have a corrosive effect is substantially accentuated.

It is an object of the present invention to overcome the foregoing drawbacks and to provide a process for cleaning gases and especially for separating from gaseous substances such as gases, vapors, and gas-vapor mixtures, entrained droplets, mist and dust particle constituents present therein as a consequence of the cooling of such substances to effect condensation of certain components or as a consequence of cooling such substances by the addition of liquids which at least partly evaporate in the gaseous substances into which such liquids are sprayed.

Other and further objects of the invention will become apparent from a study of the within specification and accompanying drawings, in which:

FIGURE 1 schematically illustrates a particular apparatus arrangement for carrying out the process of the invention, FIGURE 2 is a longitudinal sectional view of a filter device which may be used in the arrangement of FIGURE 1, and FIGURE 3 schematically illustrates an apparatus arrangement suitable in carrying out a particular embodiment of the invention.

It has been found in accordance with the present invention that a particularly effective process, for separating from gaseous substances such as gases, vapors, and gas-vapor mixtures entrained droplets, mist, and dust particle constituents present in the gaseous substance, may be carried out by moderately heating the gaseous substance after the same has been subjected to a previous separation treatment step in a particle constituent prior separation zone to remove a portion of the entrained constituents present. The moderate heating serves to raise the temperature of the gaseous substance an increment of at least a few degrees such that the moderately heated substance may be subjected to a further separation treatment step in a particle constituent further separation zone to remove substantially the remaining portion of the particle constituents present.

Preferably, the temperature may be raised an increment ranging between about 3 and 200 degrees C. and more particularly between about 20–50 degrees C. during the moderate heating step. In the same way, the pressure, in accordance with the process of the invention may range between about 10 and 100 atmospheres' gauge.

In accordance with one embodiment of the invention, the gaseous substance contains high boiling hydrocarbon components of different boiling points such that upon pre-cooling the gaseous substance a certain portion of constituents condense. By suitably carrying out the pre-cooling under pressure at a rapid rate, the gaseous substance will be under-cooled such that upon moderately heating the gaseous substance after the first separation treatment step, the lower boiling point components will be substantially evaporated. By rapidly carrying out the moderate heating step, the gaseous substance will be super-heated. Advantageously, the super-heated gaseous substance is conducted to the further separation zone at high gas velocity whereby the evaporation of a part of the remaining portion of the constituents present in the gaseous substance will be incomplete upon entry into the further separation zone, such evaporation conveniently being completed in said further separation zone.

It will be appreciated that in accordance with conventional procedures, the separation treatment apparatus may contain catalytically active or surface-active substances where particular effects are sought to be achieved. Moreover, the separation treatment steps may include the filtering of the gaseous substance to remove entrained particle constituents therefrom.

In accordance with one embodiment of the invention, therefore, a process is provided for separating from gaseous substances, such as gases, vapors, and gas-vapor mixtures entrained droplets, mist, and dust particle constituents as well as further condensable constituents present in the gaseous substance in gas or vapor form. Briefly, the gaseous substance is first cooled from a higher elevated temperature to a lower elevated temperature to under-cool the gaseous substance and effect condensation of a part of the condensable constituent therein, the under-cooled gaseous substance is then subjected to a first separation treatment step in a particle constituent first separation zone to remove at least a portion of the entrained constituents as well as at least a portion of said part of condensed constituents therefrom, whereupon the gaseous substances may be moderately heated to raise the temperature thereof an increment ranging between about 3–200 degrees C. such that substantially the remaining entrained constituents and condensed constituents may be removed in the second separation treatment step in a particle constituent second separation zone immediately after the moderate heating of the gaseous substance. Where the gaseous substance contains steam and high-boiling hydrocarbon constituents of different boiling points, boiling at least above about 300 degrees C., therein, the cooling may be advantageously rapidly carried out to cool the substance from a temperature of at least about 190 degrees C., and preferably about 280–800 degrees C., to a temperature of about 170–180 degrees C. in order to effect the under-cooling of the gaseous substance and the condensation of a part of the steam and hydrocarbon constituents present therein. Thus, at least a portion of the condensed steam and hydrocarbon constituents may be effectively separated in the first zone, together with the entrained constituents. Upon the moderate heating step, the lower boiling point condensed constituents remaining after the first zone separation treatment will be substantially evaporated. For this purpose, the moderate heating is advantageously rapidly carried out at a pressure of about 20–22 atmospheres gauge to superheat the gaseous substance to a temperature of about 200–220 degrees C. In this manner, the superheated gaseous substance may be rapidly conducted to the second zone at high gas velocity such that the lower boiling point condensed constituents which are only incompletely evaporated upon entry into the second zone will be substantially completely evaporated during the treatment in said second zone. Generally, the second zone serves to remove any components which remain in a liquid state upon the moderate heating so that the gaseous substance remaining may be effectively further treated in accordance with known techniques without encrustations and deposits being formed on subsequent apparatus.

It will be appreciated that by effecting the cooling of a gaseous substance in a rapid manner, the vapor or gas-vapor mixture will be under-cooled whereby no significant condensation will occur at that point. Nevertheless, in a later stage of the process fresh mists and droplets will form due to the lag in the condensation rate as compared with the rate of cooling. This has been a normal objection to treatment procedures of the conventional type. Significantly, in order to eliminate any later condensation of fresh mists or droplets, the gaseous substance is moderately reheated after having passed through the first separation zone whereby the remaining mists or droplets still contained in the gaseous substance in spite of such moderate reheating will then be removed in the second separation zone. Of course, selective moderate heating may be provided such that substantially the lower boiling constituents or a portion thereof will be evaporated while the remaining higher boiling constituents, solids, etc. will remain for separation in the second separation zone. The gases cleaned in accordance with the present invention may subsequently be reheated to temperatures above from about 300–600 degrees C. without entailing any troublesome corrosive effects or the formation of deposits on apparatus which might be thereafter necessary.

The separation zones in accordance with the invention may take the form of separating apparatus such as impingement separators. Alternatively, or in combination therewith, filter devices may be employed, including those having catalytically active or surface-active substances disposed thereon. Depending upon the particular arrangement desired, the separators and/or filters may be structurally combined in one-or-two unit assemblies as this will simplify the over-all apparatus arrangement.

It will be appreciated that the heat exchange procedures employed in carrying out the present invention may be performed in combination with other processes as desired.

Corrosion in separators, heaters, and other similar apparatus having parts exposed to corrosive substituents such as chlorides contained in the gaseous substances, may be avoided by providing the apparatus in question of high chrome content steel, i.e. steel containing about 10–30 percent or more chromium apart from other alloying constituents, such as nickel, tungsten, molybdenum and the like.

Referring to FIGURE 1, a separator $a$ is shown into which the gas to be treated enters via pipe $b$ and leaves the separator $a$ through the pipe $e$. The gas in the pipe $e$ enters heater $c$ from which it is conducted through a pipe $h$ to the separator $d$. The cleaned gas leaves separator $d$ through pipe $k$. Liquids and the like which are removed in separators $a$ and $d$ as well as in the heater $c$ are discharged through pipes $i$, $g$, and $f$ respectively. The apparatus is provided with pipes $u$ and $v$ through which samples may be taken, heating medium being introduced into heater $c$ and separators $a$ and $b$ through pipes $w$ and leaving these units respectively through pipes $x$. Pipes $e$ and $h$ carry pressure gauges $y$ and pipes $i$, $f$, $g$, $u$, and $v$ are provided with valves $z$.

With respect to FIGURE 2, the treated gas, vapor, or gas-vapor mixture may be passed into the filter $l$ through the branch $m$. The gaseous substance enters the impingement separator portion $n$ of the filter $l$ from whence the gaseous substance passes upwardly through the filter portion $o$ and leaves the filter device $l$ through the outlet $p$. The filter device $l$ is provided with a heating jacket $q$ into which steam or similar heating medium is admitted through pipe $r$, such heating medium or condensate leaving jacket $q$ through pipe $s$. The liquid present in the gas passing through the filter device $l$ is retained by the filter element $o$ and is withdrawn through discharge outlet $t$.

In connection with the apparatus of FIGURE 1, a hot gas-vapor mixture at a pressure between about 10 and 100 atmospheres' gauge, i.e. 20 atmospheres' gauge, which contains droplets and mists after having been cooled to 175 degrees C. and which is to be later reheated to higher temperatures, is conducted through separator $a$. The admission pipe $b$ into separator $a$ and the separator itself may be lagged and possibly provided with heating means in order to prevent a temperature drop in these elements. Such temperature drop may occur, for example by reason of changes in the flow velocity which might lead to a further formation of undesired droplets and mists. However, a substantial evaporation of droplets and mists is not intended to occur in this part of the arrangement. Conveniently, pipe $b$ and separator $a$ may be made of ordinary steel. From the separator $a$, the gas-vapor mixture still containing mists and droplets passes through pipe $e$ into heater $c$ in which such mixture is heated to a temperature at which water droplets and lower boiling oil droplets are, for the most part, evaporated. The temperature rise of the gas-vapor mixture may be more rapid than the rate of evaporation of droplets and liquids from such droplets. The gaseous components will, therefore, be superheated rapidly whereas the temperature of the droplets and mists will increase very slowly due to the large amount of heat required for evaporating the lower boiling constituents which they contain.

However, the temperature increase must not reach levels at which the higher boiling portion of the hydrocarbons present, which has meanwhile agglomerated from the mists, ceases to remain liquid and cannot be withdrawn in liquid form from heater $c$ and the subsequent separator $d$. The agglomeration of such hydrocarbon mists into larger globules simultaneously causes any finely dispersed dust particles which may be contained in the gas to be bound by the droplets and to be removed advantageously together with such droplets.

Of course, the temperature to which the mixture is heated depends upon the pressure at which the apparatus is operated. At the indicated pressure of about 20 atmospheres gauge, a temperature increase to about 200–220 degrees C. is advisable. At this temperature the non-evaporated components still contained in the gas, for example pitch, are still liquid and can be readily withdrawn therefore from the separator $d$. Accordingly, the gas-vapor mixture leaving separator $d$ is dry.

The maintenance of the correct temperature to which the mixture is heated in this respect is of significance. Thus, if too low a temperature is employed, the droplets and mists will form and be carried through the second separator. Such substances would thereafter be deposited in further apparatus used in subsequent work up of the gaseous substance, and consequently lead to the fouling and obstruction of such apparatus. On the other hand, where the temperature is maintained at too high a level, then the non-evaporating portion will thicken to such an extent that it cannot be tapped from the heater or separator in a flowable manner. It will be appreciated that separator $d$ may be supplemented by or replaced by the filter separator arrangement shown in FIGURE 2.

If corrosion is to be expected, heater $c$ and separator $d$ are preferably made of materials or are protected by materials which are able to withstand the expected corrosive attack, at least in regard to those parts which are actually exposed to corrosion. As aforesaid, a chromium steel may be used for this purpose, such steel being particularly resistant to chlorine attack, and not suffering from corrosion fatigue. The apparatus contemplated may be built of high alloyed chrome steels, i.e. steels containing about 10–30% and even more chromium in addition to other alloying components, such as nickel, tungsten, titanium, molybdenum, and the like. For after-connected apparatus, the gaseous substance leaving separator $d$ may be passed through conduits of normal steel since the gaseous substance at this point is free from objectionable droplets and mists.

Significantly, droplets which have been formed by polymerization are also eliminated in accordance with the process of the invention. If any further polymerizates should be formed, for instance, as a result of further increases in temperature, additional apparatus arrangements of the foregoing kind may be provided in tandem to rid the gaseous substances of the objectionable ingredients. In such further arrangements, additional filter devices may be employed, preferably after the second droplet separator $d$, especially where such filter includes catalytically active or surface-active substances thereon.

Where the present invention is concerned with the cleaning of pressure gasification gas for subsequent crude gas conversion, then the heat exchanger apparatus for heating the gas to the temperature required for the conversion may be preferably subdivided in such a way that the first part of the heat exchanger apparatus represents the heater $c$, the heating being effected by the already converted hot gas used as heating medium.

Advantageously, in accordance with the process of the invention, a hydrocarbon fractionation is incidentally performed in that the very high boiling hydrocarbon components, such as pitch, are extracted from the gases, vapors, or gas-vapor mixtures in liquid form, whereas the lower boiling hydrocarbons pass through the apparatus, whereby the same may be condensed by cooling at the end of the process. As a result, since the separation of high boiling components is achieved, the subsequent processing of the remaining hydrocarbons by distillation is substantially facilitated. This is of particular advantage where the hydrocarbons, after having undergone the cleaning treatment in accordance with the process of the invention, are to be submitted to a refining process, such as is used in the course of a crude gas conversion process.

The following examples are set forth for the purpose of illustrating the invention, and it is to be understood that the invention is not to be limited thereby:

*Example 1*

A gas having the following composition in percentages by volume:

| | |
|---|---|
| $CO_2$ | 27.1. |
| $C_nH_m$ | 0.5 (polymerizables, i.e. unsaturated hydrocarbons). |
| $CO$ | 22.9. |
| $H_2$ | 38.9. |
| $CH_4$ | 9.4. |
| $N_2$ | 1.2. | is to be subjected to reduction in order to convert the CO content thereof to at most about 3%. The gas leaves its production process at a temperature of 280 degrees C. and a pressure of 22 atmospheres' gauge, said gas additionally containing 0.5% $H_2S$ and 45 grams of pitch, tar, oil, and petroleum fractions (petrol) per standard cubic meter. In accordance with the process of the invention, such gas is first cooled to a temperature of 180 degrees C. by passing the same through a trickling water zone, causing removal of the tarry and dust components from the gas. The gas which still contains fine droplets of liquid mist and particles of dust is then passed through a separator device which removes a portion of these components from the gas. The quantity of substances (liquid and dust) removed in this manner is between 4 and 6 grams per standard cubic meter. The partially cleaned gas is then reheated to a temperature of 210 degrees C. and thereafter submitted to a further treatment for separation of liquids and dust. This causes another 3 to 5 grams of accompanying substances to be removed.

If this gas is finally reheated to the requisite temperature for conversion, i.e. 350 degrees C., it is found that the heater surfaces remain free from deposits. The hot gas leaves the converter at a temperature of 400 degrees C. The heat of the converted gas may thus be used first for heating the cleaned gas to the reaction temperature required for conversion and thereafter in a second heat exchanger for supplying heat to raise the temperature of the cooled gas to 210 degrees C. in accordance with the foregoing, such temperature being necessary for the final separation of entrained substances. After having been cooled to 20 degrees C., the gas composition has the following percentages by volume after conversion:

| | |
|---|---|
| $CO_2$ | 38.8. |
| $C_nH_m$ | 0.4 (polymerizables, i.e. unsaturated hydrocarbons). |
| $CO$ | 3.0. |
| $H_2$ | 48.8. |
| $CH_4$ | 7.9. |
| $N_2$ | 1.1. |

In a distillation plant, the hydrocarbons which condense when the gas is cooled are readily separated into fractions which may serve as motor fuels, Diesel oil, and heating oil.

*Example 2*

The apparatus arrangement illustrated in FIGURE 3 represents a specific application of the present invention in which, for instance, a gas-vapor mixture may be cooled from a higher elevated temperature to a lower elevated temperature so abruptly that the mixture will be undercooled. About 30,000 standard cubic meters per hour of a super-heated crude gas-vapor mixture enter a wash cooler $b'$ at $a'$ at a temperature of 800 degrees C. and a pressure of 23 atmospheres absolute. The crude gas-vapor mixture at $a'$ contains about 450 kilograms of steam and about 50 kilograms of hydrocarbon vapors per 1,000 cubic meters of dry gas. The upper limit of the boiling range of the hydrocarbons is above 500 degrees C.

80 cubic meters of tar-containing gas water at a temperature of 170 degrees C. are continuously fed into the wash cooler $b'$ at $c'$, the gas-vapor mixture being cooled in the wash cooler from about 800 degrees C. to about 190 degrees C. The gas water is taken from wash cooler $b'$ through pipes $d'$ and $e'$ to the sump $f'$ of the waste heat boiler $g'$ from whence it is conveyed through suction pipe $h'$ by pump $i'$ back through pressure pipe $j'$ to wash cooler $b'$ at $c'$. In the wash cooler about 5 kilograms of very high boiling hydrocarbons—such as bitumen and similar compounds, per 1,000 cubic meters of dry gas condense as the gas-vapor mixture is cooled. These condensed substituents are withdrawn from the cycle through discharge pipe $l'$.

The gas-vapor mixture enters the waste heat boiler $g'$ through pipe $k'$ and passes upwardly through a stack of tubes $m'$ thereby transferring a portion of its sensible heat to the feed water in which such tubes $m'$ are immersed. Low pressure steam is thus raised in the feed water and this steam leaves the waste heat boiler at $n'$.

In the waste heat boiler, the gas-vapor mixture is cooled from 190 degrees C. to 170 degrees C. so rapidly that the mixture containing droplets is under-cooled when it leaves the boiler at $o'$. This gas still contains 43 to 44 kilograms of hydrocarbon vapors and 490 kilograms of steam per 1,000 cubic meters of dry gas.

If the temperature level of 170 degrees C. is maintained constant for about 3 to 4 seconds and if the flowing mixture is taken through an impingement separator (see FIGURE 1), then in the under-cooled state of the mixture at 170 degrees C. droplets will be separated in the form of 2.5 kilograms of very high boiling hydrocarbons and 40 kilograms of water per 1,000 cubic meters of dry gas.

Although the quantities of droplets, which are separated where the temperature level is kept exactly constant, considerably fall in a second, third, and fourth separation of droplets performed at intervals of 2 to 10 seconds apart, it still proves to be impossible in this way, even if four such cleaning stages are operated in series, to obtain an under-cooled gas-vapor mixture at the waste heat boiler outlet at $o'$ in the same way as in accordance with the present invention such that the mixture will be completely free from droplets and that the dew point will be reached at 170 degrees C. at 23 atmospheres absolute.

By means of the process in accordance with the invention, however, wherein the gas-vapor mixture is heated by about 20 degrees C. after a first separation of droplets and then conducted to a second droplet separator, it is possible without any difficulty in an apparatus arrangement such as that shown in FIGURE 1 to remote mists and droplets quantitatively from the under-cooled gas-vapor mixture which leaves the waste heat boiler with such a charge of droplets.

*Example 3*

If it is intended, for instance, in the conversion of a crude gas, to increase for refining purposes the quantities of hydrocarbons which pass over the conversion catalyst in the vapor phase, the quantity of gas condensate, i.e. about 80 cubic meters per hour, which is recycled through the wash cooler $b'$ may be kept constant.

An additional quantity of up to about 8 cubic meters per hour of a liquid hydrocarbon crude product may also be introduced at $p'$ into the cycle. Such a product may have the following characteristics:

| | |
|---|---|
| Mean boiling point at 1 at. abs. ° C | 80 |
| Molecular weight | 94 |
| Heat of evaporation at 1 at. abs. kilocals/kg | 77 |
| Specific gravity kg./cu. decimeter | 0.69 |

Conveniently, the catalyst selected should be a hydrogenation catalyst containing molybdenum or cobalt-molybdenum. If the stated volumes of gas-vapor mixtures emerging from three wash coolers (see FIGURE 3), for example, are taken first through appropriate waste heat boilers (see FIGURE 3), then through a droplet separation apparatus arrangement (see FIGURE 1) and finally conducted over a total of 50 cubic meters of catalyst, a space velocity of about 0.5 cubic meter of hydrocarbons per cubic meter of catalyst per hour can be maintained. This result equals that employed, for instance, in a benzene refinery. The hydrocarbons which are thus refined contained no more than about 0.2% sulphur and are free from gums and gum forming substances.

What is is claimed is:

1. Process for separating from gaseous substances entrained droplet, mist, and dust particle constituents, said gaseous substances further containing higher boiling and lower boiling condensable constituents therein, which comprises cooling the gaseous substance under pressure from a higher elevated temperature to a lower elevated temperature to undercool the gaseous substance and effect the condensation substantially of all of the higher boiling condensable constituents therein and only partially of the lower boiling condensable constituents therein, subjecting the undercooled gaseous substance to a first separation treatment step in a particle constituent first separation zone to remove at least a portion of the entrained constituents and a portion of the higher boiling condensed constituents therefrom, thereafter moderately heating the gaseous substance to raise the temperature an increment of about 3–200 degrees C., to superheat and in turn cause the evaporation of the part of the lower boiling constituents present in the gaseous substance which condensed upon said cooling but not the remainder of the higher boiling condensed constituents present in the gaseous substance after the first separation step and then subjecting the moderately heated gaseous substance to a second separation treatment step in a particle constituent second separation zone to remove substantially the remaining entrained constituents and said remainder of the higher boiling condensed constituents therefrom without removing the so-evaporated lower boiling constituents.

2. Process according to claim 1 wherein said second separation treatment includes the conducting of the gaseous substance into contact with catalytically active surfaces.

3. Process according to claim 1 wherein the moderate heating is carried out such that the temperature is raised an increment ranging between about 20 and 50 degrees C.

4. Process according to claim 1 wherein the cooling is carried out at a pressure of from 10 to 100 atmospheres' gauge.

5. Process according to claim 4 wherein said gaseous substance contains steam and high boiling hydrocarbon constituents of different boiling points boiling at least above about 300 degrees C. therein, and said cooling is rapidly carried out from a temperature of at least about 190 degrees C. to about 170–180 degrees C. to undercool the gaseous substance and effect the condensation of a part of said steam and hydrocarbon constituents, whereby at least a portion of the condensed steam and hydrocarbon constituents will be separated in said first zone with said entrained constituents, said moderate heating being rapidly carried out to superheat the gaseous substance at a pressure of about 20–22 atmospheres' gauge to a temperature of about 200–220 degrees C. and the superheated gaseous substance being conducted to the second zone at high gas velocity whereby such lower boiling point condensed constituents are only incompletely evaporated upon entry into said second zone and such evaporation is substantially completed in said second zone.

6. Process according to claim 5 wherein at least one of the separation treatment steps includes the filtering of the gaseous substance to remove entrained condensed constituents therefrom.

References Cited in the file of this patent

UNITED STATES PATENTS

| 2,617,276 | Gard et al. | Nov. 11, 1952 |
| 2,957,925 | Oettinger | Oct. 25, 1960 |

FOREIGN PATENTS

| 19,931 | Sweden | Mar. 29, 1905 |
| 26,077 of 1912 | Great Britain | Nov. 13, 1913 |
| 561,673 | Great Britain | May 31, 1944 |